US009380606B2

(12) United States Patent
Zou et al.

(10) Patent No.: US 9,380,606 B2
(45) Date of Patent: Jun. 28, 2016

(54) SLOTTED ACCESS FOR WIRELESS COMMUNICATION DEVICES AND CONTROL THEREOF

(75) Inventors: Jialin Zou, Randolph, NJ (US); Sudeep Palat, Swindon (GB); Yu Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/009,422

(22) PCT Filed: Apr. 2, 2011

(86) PCT No.: PCT/CN2011/072436
§ 371 (c)(1),
(2), (4) Date: Oct. 2, 2013

(87) PCT Pub. No.: WO2012/135996
PCT Pub. Date: Oct. 11, 2012

(65) Prior Publication Data
US 2014/0016624 A1    Jan. 16, 2014

(51) Int. Cl.
H04W 74/08    (2009.01)
H04W 72/02    (2009.01)
H04W 28/06    (2009.01)
(Continued)

(52) U.S. Cl.
CPC .......... H04W 74/0841 (2013.01); H04W 72/02 (2013.01); H04W 4/005 (2013.01); H04W 28/06 (2013.01); H04W 28/18 (2013.01)

(58) Field of Classification Search
CPC .............. H04W 74/0841; H04W 74/0833; H04W 72/02; H04W 4/005; H04W 28/06; H04W 28/18
See application file for complete search history.

(56) References Cited

U.S. PATENT DOCUMENTS

2009/0003306 A1* 1/2009 Plutov ................ H04W 72/10
370/348
2010/0113053 A1    5/2010 Bienas et al.
2010/0272035 A1* 10/2010 Park ................ H04W 74/0866
370/329
(Continued)

FOREIGN PATENT DOCUMENTS

CN    101217808 A    7/2008
CN    101883314 A    11/2010
(Continued)

OTHER PUBLICATIONS

Alcatel-Lucent, "Load Distribution for MTC Devices", 3GPP draft R2-103759, vol. RAN WG2, Jun. 28-Jul. 2010, Stockholm, Sweden, 7 pages.*

(Continued)

Primary Examiner — Paul H Masur
Assistant Examiner — Kabir Jahangir
(74) Attorney, Agent, or Firm — Steven R. Santema

(57) ABSTRACT

An example method provides a method of determining access times and channels for a wireless communication device. One embodiment includes selecting, at a wireless communication device, one of a plurality of time intervals in a periodically repeating access cycle for transmission of an access signal based on an identification number identifying the wireless communication device, negotiating a preamble assignment for the selected one of the plurality of time intervals, and transmitting the access signal over an access channel in the selected one of the plurality of time intervals using a preamble corresponding to the preamble assignment.

6 Claims, 7 Drawing Sheets

(51) Int. Cl.
  *H04W 28/18* (2009.01)
  *H04W 4/00* (2009.01)

(56) References Cited

U.S. PATENT DOCUMENTS

| | | | | |
|---|---|---|---|---|
| 2010/0329193 | A1* | 12/2010 | Bienas et al. | 370/329 |
| 2011/0199905 | A1 | 8/2011 | Pinheiro et al. | |
| 2011/0274040 | A1* | 11/2011 | Pani et al. | 370/328 |
| 2011/0310854 | A1* | 12/2011 | Zou | H04W 74/0891 370/336 |
| 2012/0033613 | A1* | 2/2012 | Lin et al. | 370/328 |
| 2012/0082106 | A1* | 4/2012 | Wang et al. | 370/329 |
| 2012/0184306 | A1* | 7/2012 | Zou et al. | 455/458 |
| 2012/0307774 | A1 | 12/2012 | Zhao et al. | |
| 2013/0136072 | A1 | 5/2013 | Bachmann et al. | |

FOREIGN PATENT DOCUMENTS

| | | |
|---|---|---|
| CN | 101990310 A | 3/2011 |
| JP | 2013520100 | 5/2013 |
| JP | 2013524563 | 6/2013 |
| JP | 2013520041 | 5/2014 |
| WO | WO 2010/002306 A1 | 1/2010 |

OTHER PUBLICATIONS

International Search Report for PCT/CN2011/072436 dated Dec. 15, 2011.

Via Telecom, "Dispersed Access Load Over Time", 3GPP Draft R2-105437_Dispersed Access Load Over Time, XP050452471, Oct. 4, 2010, vol. RAN WG2, no. Xi'an Oct. 11, 2010, 3GPP, Sophia-Antipolis Cedex France—4 pages.

Deutsche Telecom, "Overload Control for Machine Type Communication", 3GPP Draft R2-104501, XP050451700, Aug. 16, 2010, vol. RAN WG2, no. Madrid Spain Aug. 23, 2010, 3GPP, Sophia-Antipolis Cedex France—2 pages.

Supplementary European Search Report—dated Aug. 8, 2014 (Application # 11863239.7—1857/2695469—PCT/CN2011072436)—5 pages.

Alcatel-Lucent, Comparison on RAN Loading Control Schemes for MTC, 3GPP TSG-RAN WG2#71bis R2-105623, Oct. 11, 2010—12 pages URL:http://www.3gpp.org/ftp/tsg_ran/WG2_RL2/TSGR2_71bis/Docs/R2-105623.zip.

Alcatel-Lucent, Analysis on ACB and Other Access Control Methods, 3GPP TSG-RAN WG2#72 R2-106551, Nov. 15, 2010—5 pages URL:http://www.3gpp.org/ftp/tsg_ran/WG2_RL2/TSGR2_72/Docs/R2-106551.zip.

Panasonic, Solutions for Offline Device Triggering, 3GPP TSG-SA WG2 # 83 S2-110568—3 pages, Feb. 21, 2011 URL:htpp://www.3gpp.org/ftp/tsg_sa/WG2_Arch/TSGS2_83_Salt_Lake_City/Docs/S2-110568.zip.

JP Office Action, Corresponding JP Application No. 2014502971 and pending claims (English Translation)—6 pages.

Alcatel-Lucent, Alcatel-Lucent Shanghai Bell, "Load Distribution for MTC Devices" 3GPP R2-103759, 3GPP TSG-RAN WG2 Meeting # 70bis, Stockholm, Sweden, Jun. 28-Jul. 2, 2010—7 pages, 3GPP, Sophia-Antipolis Cedex France.

* cited by examiner

SLOTTED ACCESS FOR WIRELESS COMMUNICATION DEVICES AND CONTROL THEREOF

FIELD OF THE INVENTION

This invention relates generally to communication systems, and, more particularly, to wireless communication systems.

BACKGROUND

Service providers are beginning to develop, offer, and deploy wireless communication devices referred to as machine-type communication device. A machine type communication (MTC) device differs from traditional human-to-human (H2H) communication devices because a MTC device typically involves communication between entities that do not necessarily need human interaction. For example, a MTC device can be wireless user equipment configured to gather measurement information and report this information to a central server at a particular time interval. MTC devices can be used in a wide variety of contexts such as remote meter reading for water and power companies, wireless burglar and/or fire alarm monitoring, weather monitoring, vehicle tracking, medical monitoring, and the like.

MTC devices have operational characteristics that differ markedly from the operational characteristics of conventional human-to-human (H2H) wireless communication devices. Conventional H2H communication usually requires allocating resources for substantially continuous duplex communication between users for intervals as long as several minutes or even hours. In contrast, MTC devices typically transmit relatively small amounts of information in bursts separated by relatively long and sometimes irregular intervals. For example, a MTC device for remotely reading a water meter may only transmit a burst of information indicating water usage on a monthly basis. For another example, a burglar alarm monitor may only transmit bursts of information when the alarm is triggered. Consequently, MTC devices are also typically significantly more delay tolerant than conventional H2H devices since voice communication requires delays of less than 100 ms or better. A MTC device that reads and reports water usage may be able to tolerate transmission delays of days or even weeks. Moreover, MTC devices are often fixed to particular locations and so the mobility of these devices may be significantly lower than the expected mobility of a H2H device.

The distribution of MTC devices is expected to be significantly different than the distribution of handheld wireless communication devices. Current generations (2G/3G) of wireless communication systems have been designed to accommodate capacities on the order of 100 users per cell based on expected densities of H2H devices. However, the number of MTC devices in each cell is expected to be at least an order of magnitude higher and each cell may have to support thousands of MTC devices. Randomly transmitted access signals from such a large number of MTC devices, such as access signals transmitted over a random access channel, will almost certainly lead to a very large number of collisions. Furthermore, transmissions from some kinds of MTC devices tend to be strongly correlated in time. For example, an office building may have a very large number of remotely-monitored fire alarms. Under normal conditions the fire alarms generate virtually no traffic except perhaps a periodic "I'm alive" pulse to verify they are operating. However, if a fire breaks out all of the alarms may begin to concurrently transmit large bursts of information. Correlated bursts of information from large numbers of MTC devices in a cell can generate overload conditions, congestion, and collisions between access signals.

One proposal for flattening the time distribution of access signals from machine type devices is to allow a central entity to schedule the access signals using a polling scheme. The polling based scheme requires a central entity in the network (such as the E-UTRAN) to page each device at a predetermined reporting time to determine whether the device has information to transmit. Although one-by-one paging of the devices by the E-UTRAN scheduler could avoid collisions, this approach introduces much signaling overhead, particularly over the forward link. The efficiency gains from flattening the access transmission distribution are not thought to justify the high cost in overhead and complexity introduced by this method.

An alternative proposal is to apply the conventional random access method with access barring mechanisms such as using random back-offs to resolve collisions between the random access signals (access probes). Although this approach can flatten the time distribution of the access signals, the overhead costs would be considerable. For example, a large number of access collisions may be generated if a large number of MTC devices send random access request signals at the same time. Backing off some of the request signals would flatten the distribution but may still lead to additional collisions between retransmissions when the number of requesting devices is large. The efficiency of the system is therefore reduced (and the reverse link signaling overhead increased) by using back-offs and retransmissions to resolve the collisions. The retransmissions may also introduce more delay of reports from the MTC devices and create more uncertainty on the actual reporting time.

SUMMARY

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment a method includes selecting, at a wireless communication device, one of a plurality of time intervals in a periodically repeating access cycle for transmission of an access signal, the selection being performed based on an identification number identifying the wireless communication device; negotiating, at the wireless communication device, a preamble assignment for the selected one of the plurality of time intervals; and transmitting, at the wireless communication device, the access signal over an access channel in the selected one of the plurality of time intervals using a preamble corresponding to the preamble assignment.

In one embodiment, the IDs of the communication devices are pre-arranged or assigned to minimize the number of the devices sharing a specific time interval.

In another embodiment, negotiating the preamble includes requesting the preamble assignment for the selected one of the plurality of time intervals from a network node and receiving the preamble assignment for the selected one of the plurality of time intervals from the network node. The preamble assignment for the selected one of the plurality of time intervals may be unique to the wireless communication device.

In one embodiment, the method also includes receiving a blocking signal indicating at least a first time interval of the plurality of time intervals in which access should be prevented and blocking transmission of the access signal over an access channel in the selected one of the plurality of time intervals using a preamble corresponding to the preamble assignment based on the blocking signal.

In one embodiment, the method also includes defining the plurality of time intervals in the access cycle based on synchronization information broadcast over an air interface to the wireless communication device so that the wireless communication device is synchronized with other wireless communication devices on the same access cycle with the same numbering of the time intervals.

In one embodiment, the plurality of time intervals are a plurality of time slots in the periodically repeating access cycle, and selecting one of the plurality of time intervals includes selecting one of the plurality of time slots based on a slot numbering comprising system frame number associated with the selected one of the slots and broadcast over the air interface. In one embodiment, selecting one of the plurality of time slots may include selecting a time slot associated with a system frame number when the system frame number is equal to the identification number modulo a period of the access cycle. In another embodiment, selecting one of the plurality of time slots includes selecting a time slot associated with a system frame number when the system frame number is equal to a selected portion or permutation of the identification number. In yet another embodiment, selecting one of the plurality of time slots comprises selecting a time slot associated with a system frame number when the system frame number is equal to a hash of the identification number.

In one embodiment, a period of the access cycle is equal to a period of a paging cycle for the wireless communication device, and selecting said one of the plurality of time intervals for the access signal comprises selecting a time interval immediately following a time interval assigned for paging the wireless communication device. Selecting said one of the plurality of time intervals may include selecting one of the plurality of time intervals in an access cycle determined by a reporting interval for the wireless communication device.

In one embodiment, a method comprises constraining a wireless communication device to transmit access signals over an access channel corresponding to a negotiated preamble assignment during one of a plurality of time slots that make up a periodically repeating access cycle. In one embodiment, constraining the wireless communication device to transmit the access signals over the access channel corresponding to the negotiated preamble assignment during the one of a plurality of time slots may include constraining the wireless communication device to transmit in the one of the plurality of time slots associated with a system frame number when the system frame number is equal to the identification number modulo a period of the access cycle. In another embodiment, constraining the wireless communication device to transmit the access signals over the access channel corresponding to the negotiated preamble assignment during the one of a plurality of time slots may include constraining the wireless communication device to transmit on the access channel corresponding to the negotiated preamble assignment received from a network node for the one of the plurality of time intervals. In yet another embodiment, the preamble assignment for the one of the plurality of time intervals is unique to the wireless communication device.

In one embodiment, the method also includes receiving a blocking signal indicating at least a first time interval of the plurality of time intervals in which access signals should be prevented and constraining the wireless communication device from transmitting in the one of the plurality of time intervals when the first time interval corresponds to the first time interval of the plurality of time intervals. In one embodiment, constraining the wireless communication device to transmit in said one of the plurality of time slots may include constraining the wireless communication device to transmit in a time slot associated with a system frame number when the system frame number is equal to a selected portion of the identification number, when the system frame number is equal to a hash of the identification number, or when the system frame number is pre-assigned by the base station.

In one embodiment, a period of the access cycle is equal to a period of a paging cycle for the wireless communication device, and wherein constraining the wireless communication device to transmit in said one of the plurality of time intervals comprises constraining the wireless communication device to transmit in a time interval immediately following or at a time interval assigned for paging the wireless communication device.

In yet another embodiment, the method includes transmitting the access signal from the wireless communication device in said one of the plurality of time intervals during an access cycle determined by a reporting interval for the wireless communication device.

In one embodiment, a method comprises, in response to receipt of a request from a wireless communication device for a preamble assignment for one of a plurality of time intervals that make up a periodically repeating access cycle: determining by a network node a unique preamble assignment for the wireless communication device for the one of the plurality of time interval, and providing, from a network node, the unique preamble assignment for the one of the plurality of time intervals to the wireless communication device.

In one embodiment, the method further includes broadcasting, from the network node, information defining a plurality of time slots that make up a periodically repeating access cycle for a random access channel, wherein each wireless communication device served by the base station is constrained to transmit access signal signals over the access channel during a selected one of a plurality of time slots.

In one embodiment, the method includes detecting a collision between an MTC device and a human to human device, and sending the response with the ID of the human to human device. In one embodiment, the method includes assigning IDs to MTC wireless communication devices such that the devices are evenly distributed over all the time slots in an access cycle. In one embodiment, IDs are assigned to MTC wireless communication devices based on a priority of the MTC wireless communication devices such that first (e.g., low) priority devices are assigned to first (e.g., low) priority slots and second (e.g., high) priority devices are assigned to the second (e.g., high) priority slots.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
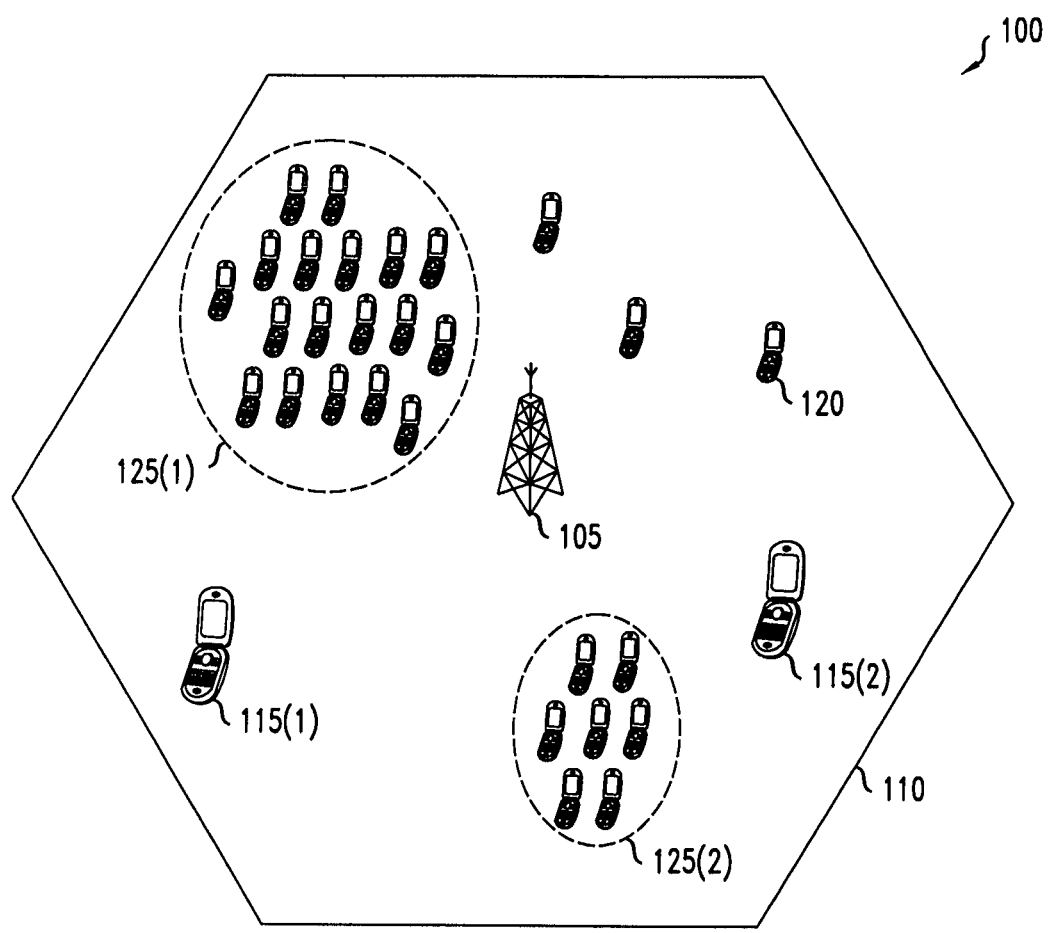
FIG. 1 conceptually illustrates one example embodiment of a wireless communication system.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates one example embodiment of a wireless communication system 100. In the illustrated embodiment, the wireless communication system 100 includes a base station 105 that provides wireless connectivity within a geographic region or cell 110. The cell 110 is depicted as a perfect hexagon in FIG. 1. However, persons of ordinary skill in the art having benefit of the present disclosure should appreciate that this is an idealization and actual cells may have irregular and/or time varying boundaries. Furthermore, in alternative embodiments, the base station 105 may be configured to provide wireless connectivity within portions or sectors of the cell 110, e.g., using multiple antennas or arrays of antennas. Wireless connectivity can be provided using well known standards and/or protocols and in the interest of clarity only those aspects of the standards and/or protocols that are relevant to the claimed subject matter are discussed herein. For example, wireless connectivity in the system 100 may be provided according to wireless standards and/or protocols including TDMA, FDMA, CDMA, UMTS, LTE, WiMAX and the like.

One or more human-to-human (H2H) wireless communication devices 115(1-2) may be located within the cell 110. The H2H devices 115 may use a wireless connection to the base station 105 to communicate with each other or other devices. Exemplary H2H devices 115 may include cellular phones, smart phones, notebook computers, laptop computers, and the like. Machine type wireless communication (MTC) devices 120 may also be distributed throughout the cell 110. In the interest of clarity, only one of the MTC devices is specifically indicated with the numeral "120." The number of MTC devices 120 shown in FIG. 1 is intended to be illustrative. Persons of ordinary skill in the art having benefit of the present disclosure should appreciate that an actual deployment of MTC devices 120 may include hundreds or thousands of MTC devices 120 within the cell 110.

In some embodiments, some of the MTC devices 120 are parts of groups 125(1-2). For example, the MTC devices 120 in the group 125(1) may be fire alarms or smoke detectors within a particular building. For another example, the MTC devices 120 in the group 125(2) may be wireless detectors that form part of a security system for a building such as open-door detectors, glass break detectors, motion sensors, and the like. The MTC devices 120 in a group 125 do not necessarily need to be physically proximate to each other. For example, a group 125 of MTC devices 120 may be deployed in taxicabs and used to provide periodic location reports to a dispatcher.

The MTC devices 120 implement one or more MTC applications that provide reports over the air interface to the base station 105 at particular intervals. In one embodiment, an application operating on the MTC devices 120 may support periodic short data reporting. Alternatively, the application may provide data in response to a request from received from the base station 105 or in response to the occurrence of some condition or criteria. The reporting interval can vary significantly depending on the type of application and may range from less than one minute to more than one month. In some embodiments that allow the MTC device 120 to report very frequently, e.g. at intervals much shorter than a minute, the MTC device 120 may remain in the active mode and skip the access process, thereby reducing or avoiding the access collision issue in these circumstances. Moreover, the precise transmission time can vary within a tolerance that can be a fairly large percentage of the overall reporting interval, e.g., around 1-10% of the interval, although the exact tolerance may be different for different applications. The reported data may include values of measurements such as time-of-day, temperatures, locations, test conditions/results, environmental conditions, and the like. The measurements may be performed using sensors incorporated within the MTC devices 120 or may be provided to the MTC devices 120 via external devices for transmission over the air interface.

The large number of MTC devices 120 within the cell 110 could potentially lead to collisions between reverse link access transmissions from the MTC devices 120. For example, large numbers of access request signals over random access channels could lead to a relatively large number of collisions. MTC devices 120 could share the same random access channels as the H2H devices 115 in which case the access signals from the MTC devices 120 may also collide with access signals from the H2H devices 115. Alternatively, the MTC devices 120 and the H2H devices 115 could utilize different channels to prevent collisions between transmissions by the two types of devices. Moreover, access signal by MTC devices 120 within the groups 125 can be strongly correlated in time and space. For example, if a fire breaks out in the building that contains the MTC devices 125(1), it is likely that many if not all of these devices 125(1) may transmit access signals concurrently or even simultaneously. Such a large number of concurrent access signals can lead to a correspondingly large number of collisions between these access signals.

Access requests/signals by the different MTC devices 120 can be coordinated to attempt to reduce collisions between reverse link traffic. In one embodiment, the temporal structure of the reverse link can be divided into a series of periodically repeating access cycles that are subdivided into time intervals such as time slots of the reverse link channel. The MTC devices 120 may attempt to reduce the incidence of access request collisions by selecting one of the time intervals in each access cycle for transmission of access requests. The MTC device may then negotiate a preamble assignment for the selected one of the plurality of time intervals. After the preamble assignment is negotiated, the MTC device may transmit an access signal over an access channel in the selected one of the plurality of time intervals using a preamble corresponding to the preamble assignment.

For example in a LTE system, each MTC device 120 may select a time slot in the access cycle by comparing system frame numbers (SFNs) of the slots to their internal identifiers, as discussed herein. After negotiating a preamble assignment for the selected slot, access requests can then be transmitted over the access channel corresponding to the preamble of the preamble assignment in the selected time intervals. In other embodiments, the MTC devices 120 can be constrained in other ways to transmit access signals over an access channel corresponding to the preamble of the preamble assignment during one of the time intervals that make up a periodically repeating access cycle. For example, the MTC device 120 may be constrained to transmit access signals in selected slot based using a preamble that is based on a preamble identifier pre-assigned to the MTC device 120 during for example, manufacture or installation of the MTC device.

Figure 2:
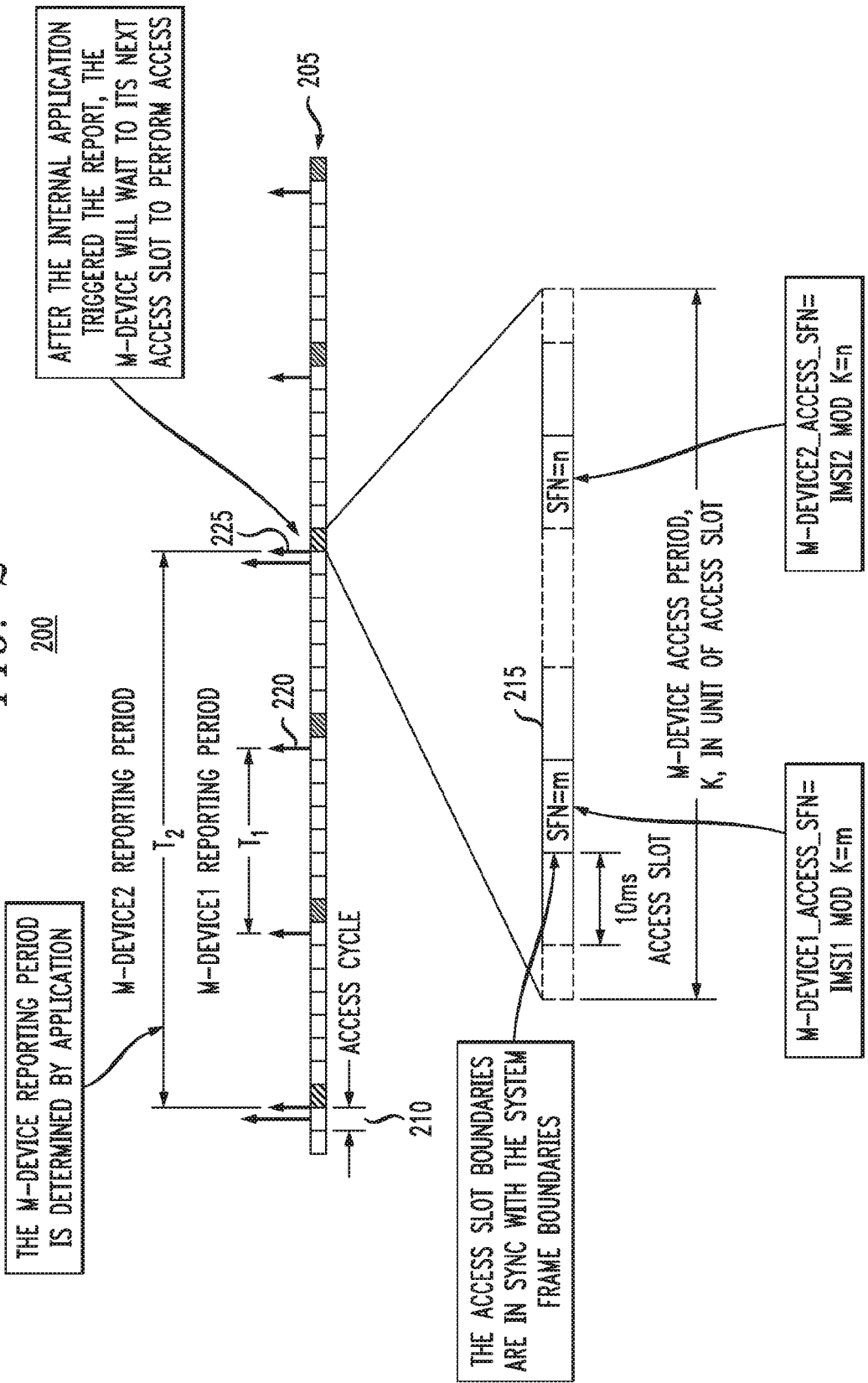
FIG. 2 conceptually illustrates one example embodiment of a timing diagram for a random access channel.

FIG. 2 conceptually illustrates one example embodiment of a timing diagram 200 for a random access channel 205. The timing diagram 200 depicts events that may occur in one embodiment of a slotted access method used by MTC devices such as the MTC devices 120 depicted in FIG. 1. In the illustrated embodiment, two MTC devices transmit access request signals in accordance with their reporting cycles. Each MTC device is constrained so that it is only allowed to transmit the access request in its own access slot within an access cycle and using its own assigned preamble. Constraining access signal transmission in this way can reduce or minimize the chance of access collision by making the MTC devices transmit access signals in a pre-scheduled fashion. The access slots may be selected by and/or for each MTC device using identifying information that is available to both the MTC device and the network and similarly the assigned preamble may be based on information available to the MTC and/or network. The access timing may therefore be predictable at both the network and the MTC device.

The random access channel 205 is temporally divided into periodically repeating access cycles 210. Each access cycle has a length of K time intervals. In one embodiment, the unit of the access cycle 210 is the system frame and the boundaries of the access cycle 210 are aligned with the system frames. For example if K=4096, then each access cycle 210 has 4096 access slots 215 with a slot duration that is equal to one system frame duration (e.g., 10 ms). The period of the access cycle 210 is about 41 s. However, persons of ordinary skill in the art having benefit of the present disclosure should appreciate that the value of K can be different for different cells and different deployment configurations. In one embodiment, the network could determine the value of K for a cell based on an estimate or an expectation of the total number of MTC devices that may be deployed in the cell. Cells that handle smaller numbers of MTC devices could set K to a lower value, e.g. 1024, and cells that handle even larger numbers of MTC devices could have larger values of K.

The two MTC devices implement applications that have reporting intervals of $T_1$ and $T_2$, respectively. The application in the first MTC device initiates transmission of an access request at the times indicated by the solid arrows 220 and the application of the second MTC device initiates transmission of access requests that the times indicated by the dashed arrows 225. In response to initiation of the access request by the application, the MTC device first selects an access slot in the next access cycle to use to transmit the access request.

In some cases, the two MTC devices may determine to initiate transmission of access requests during the same access cycle. Access requests transmitted by either of the MTC devices may also potentially collide with transmissions by other devices during the same access cycle.

Collisions can be avoided by selecting an access slot 215 in the access cycle 210 based upon information associated with and/or identifying the different MTC devices. In the illustrated embodiment taking LTE as an example, access slots 215 can be identified using the value of the system frame number modulo the number of slots in the access cycle (SFN mod K). The SFN can be broadcast from cell or base stations in a master information block (MIB) that may also include information indicating the LTE downlink bandwidth (DL BW), number of transmit antennas, PHICH duration, its gap, and possibly other information. By tracking the broadcast SFN information, the MTC devices may be synchronized with the same access cycle and the access slots. Each MTC device is allowed to access slots that are selected based on a comparison of the SFN and information identifying the MTC device. For example, each MTC device can use its international mobile subscriber identity (IMSI) to select the slot whose SFN mod K=(IMSI+1)mod K. However, persons of ordinary skill in the art having benefit of the present disclosure should appreciate that other techniques can be used to choose slots. For example, the slots could be chosen based upon the most significant bits of the IMSI, the least significant bits of the IMSI, a pseudorandom number generated by hashing the IMSI, a unique number assigned to each MTC and the like. In order to minimize the chance of collision between MTC device access and paging, the SFN cycle broadcast by the system may be selected to be long enough to support the synchronization of a long enough access cycle. For example in current LTE standard, 4 MSBs of SFN could be added to the MIB to ensure that the MTC access cycle and paging cycle are long enough. For example, if K=4096, there will be 4096 unique MTC device IDs that could be supported in a cell. Thousands of MTC devices could therefore be accommodated in an access cycle without collision.

In one embodiment, power can be saved by the MTC devices by aligning the MTC access cycle with the paging cycle. The MTC device wakes up at its paging slot to see if any pages are being sent by the network. Selecting the access slot of the MTC device to be the slot after the paging slot allows the MTC device to remain in the active state for an additional slot as opposed to having to cycle through the sleeping and waking-up processes between paging slots and access slots. A longer DRX/paging cycle may be defined for MTC devices in some embodiments to accommodate the large number of MTC devices when paging is supported for MTC devices. For example, the paging cycle and access cycle could be configured so that the paging cycle=access cycle>=DRX cycle. Setting the paging cycle to be smaller than the DRX cycle would therefore not be allowed for MTC devices in this embodiment. Considering certain low cost MTC devices may not support paging and/or data polling, when data reporting is triggered by application, these devices may be able to acquire synchronization for access in the next access slot when they wake up at their paging slot. In one embodiment, the access slot may be selected to be the same slot as the paging slot of a MTC device as long as the system implements a mechanism to prevent conflicts or duplication between the paging driven access and automated access.

Collisions or other access failures could still occur even when the slot selection techniques described are employed especially in embodiments in which there are numerous MTC devices and/or the MTC devices share the same access channel with the H2H user equipment. Accordingly, to avoid collisions, the MTC device negotiates with the base station or other radio access network node for an assigned preamble in the selected slot. In one embodiment, the base station maintains a list of the slot and preamble assigned for a respective MTC device and assigns a unique preamble for each MTC device that will access the base station in any particular slot. In another embodiment, after assigning all possible unique preambles to MTC devices requesting an preamble assignment for a particular slot, the base station assigns a non-unique (i.e., already assigned) preamble to a MTC device. In this embodiment, when the initial access attempt by a MTC fails, the MTC device may proceed according to a number of alternative embodiments. In a first of these embodiments, the MTC device follows existing retry procedures (e.g. a random back-off) and then attempts to perform the access again. However, there may be an increased chance of access collision because the retry attempt is a random access. In a second of these embodiments, the MTC device backs off to the next access cycle and then the retries at its selected access slot in the next access cycle. This approach has very low chance of collision and the procedures are easier to implement than conventional random access procedures with access barring. The drawback of this option may be the back-off delay that results from the MTC device having to wait till next access cycle to perform access. However, for MTC devices the access cycle delay may be tolerable. For example, a delay that is approximately as long as the access cycle of 4096 frames would be approximately 41 s, which is not significant when compared to a much longer data reporting cycle e.g. 30 min. In a third of these embodiments, the network schedules the retry attempt. For example, the network can determine which access slot a MTC device can use to transmit an access request signal. If the access request is not received, the network may poll that MTC device. The merit of this approach is that the retry delay and retry collision may be reduced. However the complexity of the network functionality used to support MTC devices may be increased significantly.

Figure 3:
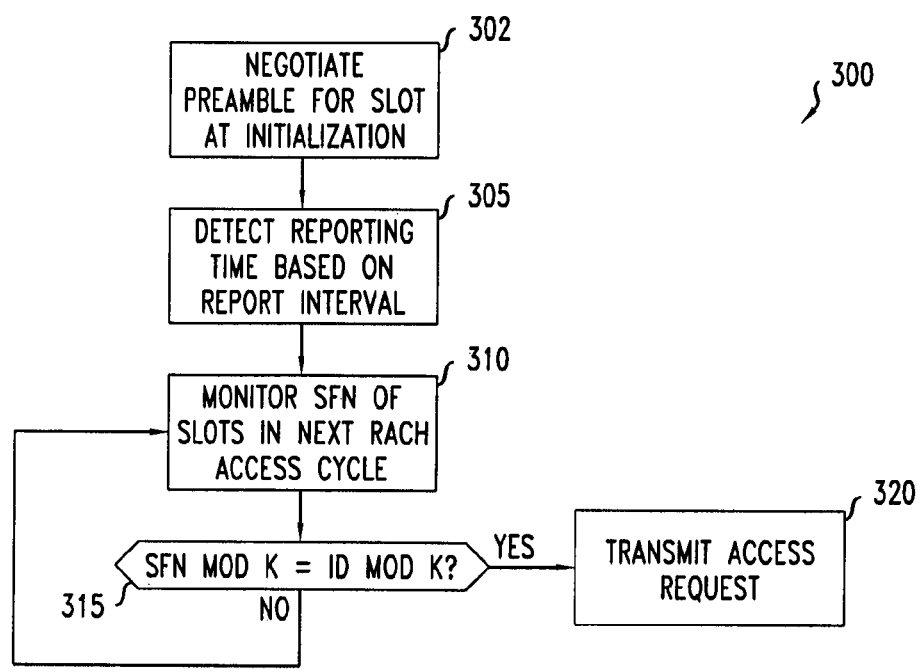
FIG. 3 conceptually illustrates one example embodiment of a method of transmitting access requests.

FIG. 3 conceptually illustrates one example embodiment of a method 300 of transmitting access requests. At the power-up initialization stage, the MTC device negotiates (at 302) a preamble for the pre-selected slot of the random access channel. The base station will assign a preamble uniquely different from the preambles of the other MTC devices sharing the same slot. In the illustrated embodiment, an MTC device detects (at 305) a reporting time based on a reporting time interval. For example, an application running on the MTC device may determine that the reporting time interval has elapsed since the last report and so may signal the MTC device to access the network to provide the report. The MTC device may identify its next available access slot for access. If its access slot has already passed in this access cycle, the MTC device may monitor (at 310) system frame numbers of the slots of the next available access cycle to determine SFNs of the slots and select or identify its time slot by comparing the SFNs to an identifying number such as the MTC device's IMSI. In the illustrated embodiment, the access cycle includes K slots and the MTC device selects the slot that has a SFN that satisfies the condition (at 315) that SFN mod K=ID mod K. However, as discussed herein, the MTC device can use other criteria for selecting (at 315) a slot to transmit an access request. After identifying its own access slot, the MTC device transmits (at 320) the access request with the assigned preamble in the pre-selected slot of the random access channel.

Figure 4:
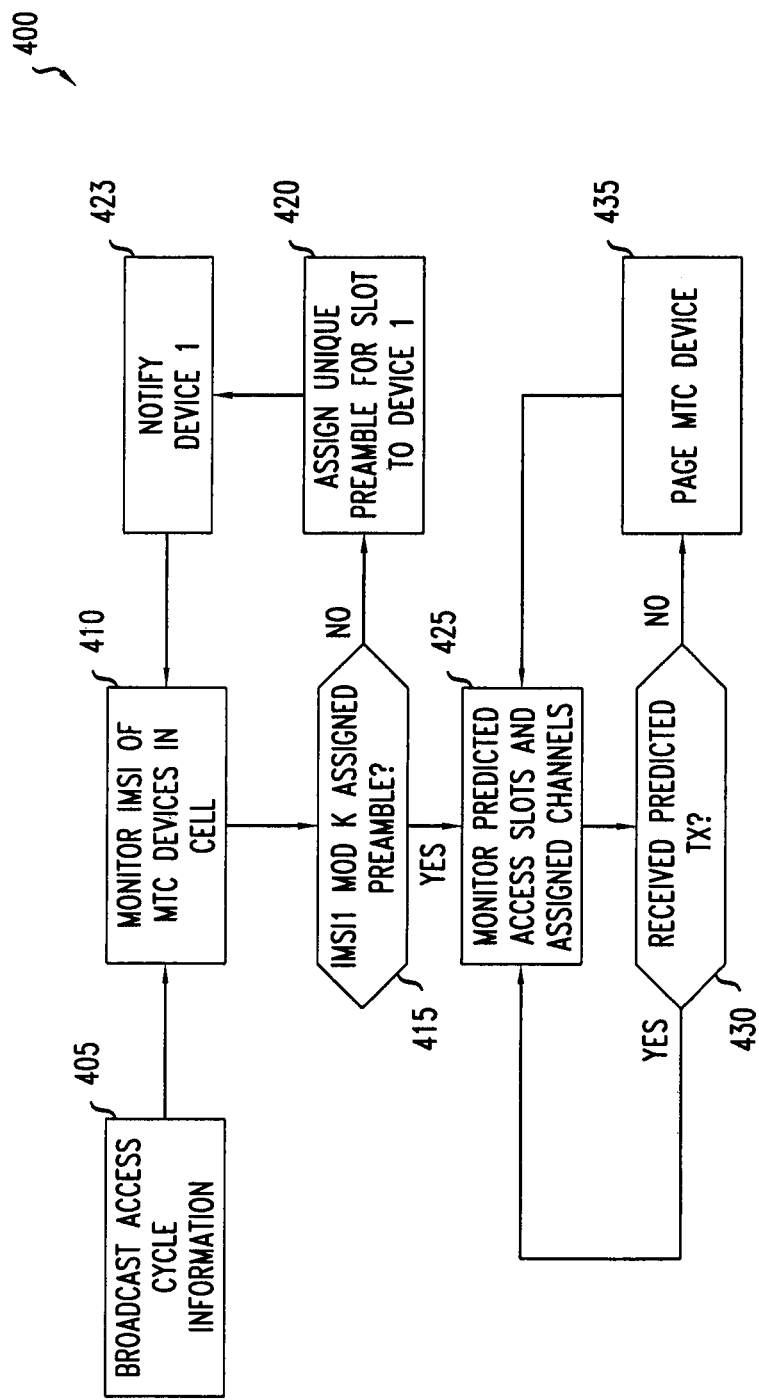
FIG. 4 conceptually illustrates one example embodiment of a method of monitoring access requests.

FIG. 4 conceptually illustrates one example embodiment of a method 400 of monitoring access requests. In the illustrated embodiment, the method 400 may be implemented in a base station, a base station router, access point, or any other device or devices that are used to provide wireless connectivity to MTC devices and/or H2H user equipment. An access cycle is determined for the MTC devices and then broadcast (at 405) over the air interface into the cell and/or a sector associated with the base station. As discussed herein, the access cycle defines the temporal structure of the reverse link by dividing transmission intervals into a series of periodically repeating access cycles that are subdivided into time intervals such as time slots of the reverse link channel. The period of the access cycle (K) can be determined by the base station or may be provided to the base station by some other entity. The MTC devices monitor and track the broadcast access slot numbers (SFN) and the access cycle. They may therefore be synchronized with the same access slot number and cycle.

The base station determines or monitors (at 410) the information identifying the MTC devices (or other user equipment) located within the cell. In the illustrated embodiment, each MTC device and other mobile unit is assigned an international mobile subscriber identifier (IMSI) that can be communicated to the base station. The base station can determine (at 415) whether the information used by different MTC devices to access slots is the same and whether a particular MTC has been assigned a preamble for use with an access slot. For example, the base station can determine (at 415) based on IMSI1 mod K the slot in which a wireless communication device will transit an access signal and whether the wireless communication device has been assigned a preamble. For example, when IMSI1 mod K=IMSI2 mod K for devices having IMSI values of IMSI1 and IMSI2 and these modulo values are the same, the two devices will utilize the same slot of the access cycle and thus, the chance of a collision between these two devices on the access channel may be increased. Accordingly, the first time the IMSI for a wireless communication device is provided to a base station, the base station assigns a unique preamble for the wireless communication device to utilize for transmitting an access signal over the access channel. The base station therefore assigns (at 420) a unique preamble for use by the wireless communication device in the slot so that the two devices assigned to the same slot in the access cycle will utilize different preamble. The base station can page one of the MTC devices and notify (at 423) the MTC device of the slot offset. Then the MTC device can perform access at the slot with the slot number equal to the number based on IMSI and using the assigned preamble. In this way the MTC device can be guided to an access slot/preamble combination not occupied in this cell. This process may be repeated until all of the MTC devices and/or user equipment within the cell have unique values of the information used to select slot and preamble in the access cycle. However, in some embodiments, some overlap between the identifying information may be tolerable, e.g., if devices sharing the same information are not expected to collide frequently.

In another embodiment, instead of a MTC device determining its access slot by itself based on the device ID, the base station of the cell could assign a dedicated access slot number and dedicated preamble for the slot to the MTC device through signaling. For example, the base station could transmit a dedicated access slot number and preamble to the MTC device when the MTC device is first deployed in the cell or sector served by the base station. The dedicated access slot numbers and preambles to be drawn from a pool of available access slot number and preamble combinations to avoid collisions with MTC devices that were previously assigned other dedicated access slot numbers and preambles from the pool. This embodiment can reduce or eliminate collisions between MTC devices within a particular cell at the cost of more signaling overhead and complexity when the MTC devices are first deployed. However, many MTC devices are fixed or have very limited mobility and so they are not expected to leave their initial cell frequently. Some MTC devices are expected to remain in their initial cell for their entire operational lifetime. The additional cost of allowing the base station to select the dedicated access slot numbers and preambles and transmit them to the MTC devices may therefore be relatively small when averaged over the life of the MTC device.

The base station can use the identifying information to predict and monitor (at 425) the access slot and access channel preamble pairs used by the MTC devices and/or other user equipment. When the base station receives (at 430) information from the MTC devices and/or user equipment in the predicted slots and channels, then it can continue to monitor the access slot and access channel preamble pairs. However, an error may have occurred if no information is successfully received from the MTC devices and/or other user equipment access requests are in the assigned access channel preamble for the predicted slots. For example, the wireless communication device may fail to transmit the access request in the selected access slot on the assigned channel. For another example, the wireless communication device may transmit the access request but the base station may fail to properly decode the received transmission. The base station may therefore page (at 435) the MTC device and/or other user equipment that was expected to transmit in the monitored access slot. The page can be used to determine whether the MTC device (or other user equipment) is operating correctly within the cell.

Figure 5:
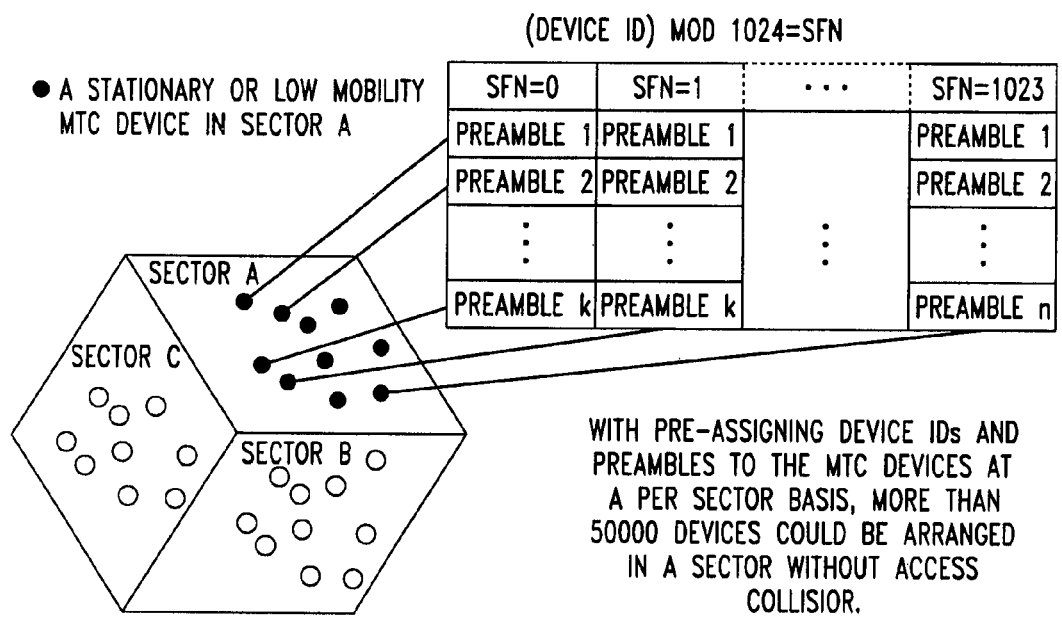
FIG. 5 conceptually illustrates one example embodiment of an access cycle with access slots and preambles being assigned of wireless communication devices.

FIG. 5 conceptually illustrates one example embodiment of an access cycle with access slots and preambles being assigned to wireless communication devices of a particular sector. As shown in FIG. 5, a stationary or low mobility MTC device is associated with the particular time slot of an access cycle and assigned a particular preamble to utilize that time. With pre-assigning device ID's and preambles to the MTC devices at a per sector basis, an MTC device will occupy one access slot and with a unique preamble different from the other MTC devices sharing the same slot. Even with random assignment of device ID's, assignment of unique preamble for a slot associated with a MTC device will assist with the avoidance of collisions. Thus, a large number of devices (e.g., 50000) could be arranged in a sector without access collision in an access cycle.

Pre-assignment of device ID's can also assist in the even distribution of MTC devices into slots of the access cycle. Further, pre-assignment of device ID's may be utilized to group MTC devices having a similar priority (e.g., a group or type of MTC devices being assigned a particular set or range of device ID's) in order that sets of MTC devices are mapped to the same time interval in the access cycle for transmission of access requests using an assigned preamble. In this manner, additional control may be provided to constrain access request transmissions of a particular group or type of MTC devices by preventing transmission in a particular time slot.

Figure 6:
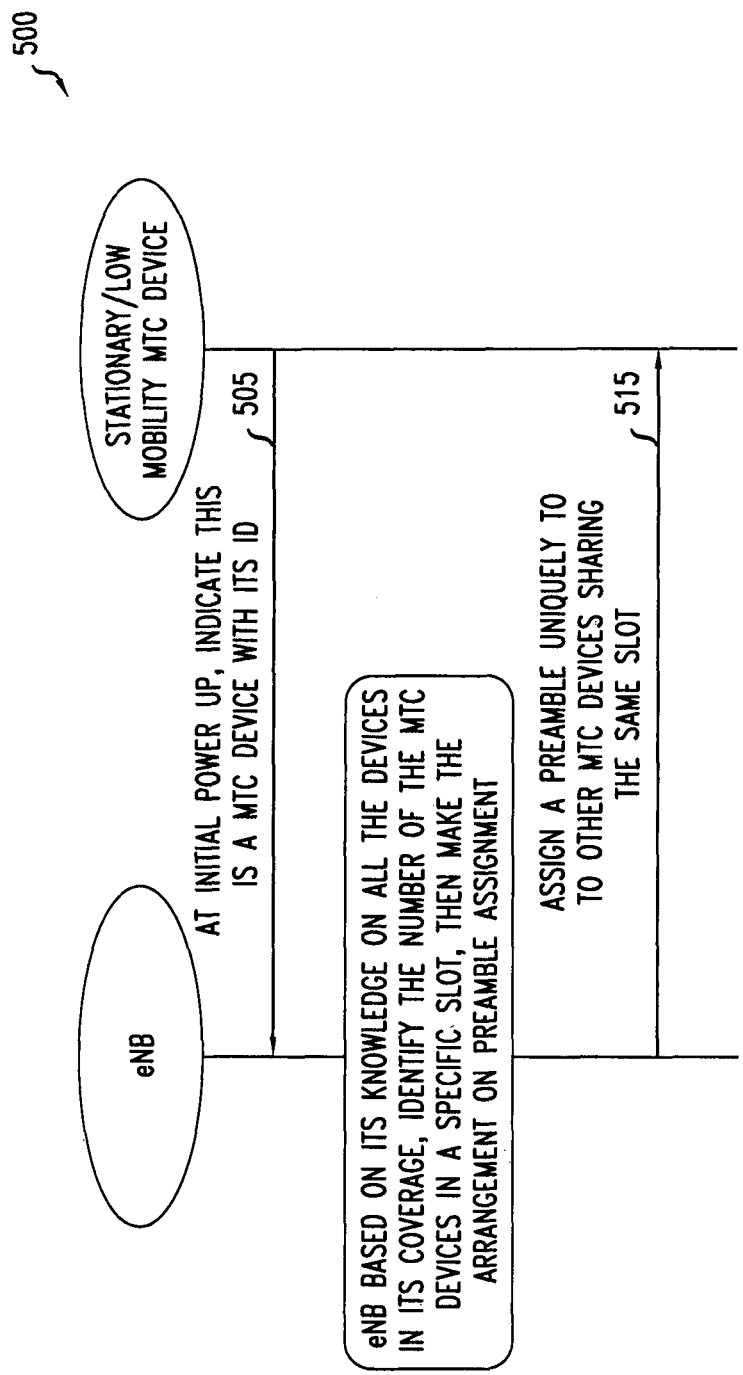
FIG. 6 conceptually illustrates one example embodiment of method of assigning a preamble to a MTC device.

FIG. 6 conceptually illustrates one example embodiment of method of assigning a preamble to a MTC device. At initial power up, (at 505) a stationary/low mobility MTC device indicates this characteristic via an indication in a message and also indicates its ID. In response to receipt of the MTC device ID, the eNodeB, based on its knowledge of all the devices in its coverage, identifies the number of MTC devices in a specific slot and make a preamble assignment for the MTC device. The eNodeB provides (at 515) the unique preamble assignment to the MTC device for future use. However, a human-to-human mobile device may move into the cell and use a preamble the same as an MTC device, which may cause a collision. Therefore, in one embodiment, when the wireless network detects a collision, the network will respond with higher priority to the human to human (H2H) device with the ID of the H2H devices in the response message.

Figure 7:
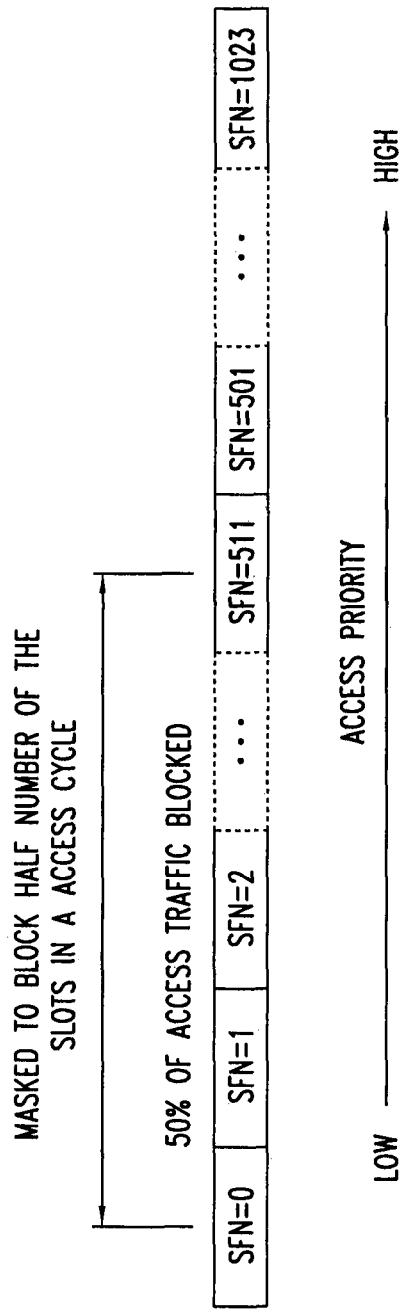
FIG. 7 conceptually illustrates one example embodiment of a blocking of a plurality of access slots due to system congestion.

FIG. 7 conceptually illustrates one example embodiment of a blocking of a plurality of access slots due to system congestion. MTC device may be assigned IDs that correspond to a priority level such that low priority slots are assigned to low numbered slots in the access cycle. For example, the IDs assigned to low priority MTCs may hash into low numbered slots. In response to detecting system congestion, the eNodeB may block a select percentage (e.g., half, 50%, 25%) of the slots in an access cycle based on the level of congestion in order to the reduce congestion. The blocking may be performed based on priority; that is slots for the lowest priority MTC traffic may be blocked first. Identification of the slots to be blocked may be communicated to wireless communication devices associated with a particular slot in order that the wireless communication devices will be constrained from transmitting on an access channel in one or more time intervals of the access cycle.

For example, priority could be defined to associate with the slots from low to high. The network equipment forwards (e.g., broadcasts) a message with a mask indicating to the UE/s which slots are to be blocked. If a UE sees its assigned slots are to be blocked, the UE shall not perform the access (i.e., shall be constrained from performing the access). If the priority associated slots are defined, the mask will start from the slots with low priority. If the priority is not defined, the mask could be randomly shifted periodically or from time to time to ensure a level of fairness to all the MTC devices. Thus, a MTC device may receive a blocking signal indicating at least a first time interval of the plurality of time intervals in which access should be prevented. Thereafter, MTC device/s will block transmission of the access signal over an access channel in the selected one of the plurality of time intervals using a preamble corresponding to the preamble assignment based on the blocking signal.

Note that though the correspondence described is between low priority and low numbered slots, the IDs assigned low priority numbers may hash into high numbered slots and thus, high number slots would be blocked first during congestion. It may also be that the MTC device IDs and the associated priority of the MTC devices correspond to slots in a disjoint manner. For example, lowest priority MTC devices may map to a set of slots include a number of low numbered slots and a number of high numbered slots. In that, in that case, a blocking mask may be applied to some low number slots and some high number slots when a congestion event occurs with the particular slots to be blocked communicated to appropriate MTC devices.

As mentioned above, in one embodiment, MTC devices may be randomly assigned an ID. When the MTC device ID is randomly assigned, a device will be randomly assigned an access slot. In addition, in one embodiment, the device also randomly picks a preamble. In this embodiment, additional enhancements such as dynamically adjusting the Random access response (RAR) detection window and backoff may further improve the access performance.

There are two bottlenecks in random access: RAR window size and msg3 transmission (in sequence: msg1 being an access request; msg2 being a random access response; and msg3 being a mobile acknowledge). First, for RAR window size, it is assumed that the system has the resource to allocate at most three (3) preambles in each subframe. With a RAR window size of five (5) there could be at most fifteen (15) preambles allocated. This is not sufficient for large amount of MTC access. Another bottleneck is msg3 transmission. In collision, the collided preambles usually can not be discovered by the eNB, so the eNB sends back the RAR message, and all the collided UE will receive the same RAR message. This causes the collision of msg3 until the retransmission limit is reached. Retransmission of msg3 causes much delay and wastes system resources.

One solution for the first bottleneck is to optimize the RAR window size according to the access loading. The eNB can estimate the access intensity of the UE according to the number of the received preambles. The estimation can be simplified by linear estimation. The number of msg1 transmitted may be approximately linear to the required RAR window size. So, for example, if the window size in use is five (5), the number of msg1's transmitted should be controlled to below thirty (30). And furthermore, below this, all the UE can access without any restriction. When the eNB knows this, it can estimate the collision probability and indicate to the UE the current access intensity, collision probability and the tuned access parameters, for example, to configure new access slot length. A step granularity may be utilized, for example a 10% step, i.e. increase or decrease the slot length by 10%.

The msg3 collision probability can be modeled as a second degree polynomial and expressed by the collision probability, x, of msg1. ($Y=ax^2+bx+c$).

After the msg3 collision probability estimation is obtained, the UE will not access the system if the estimated msg3 collision probability is larger than a predefined threshold. It will check back after a back off time (e.g., back-off Slot_K_system).

If the msg3 collision probability is less than the threshold, the UE applies the new access distributing parameter to choose the access occasion, with the consideration of the number of preamble attempts tried (e.g., number_preamble_tx). In one embodiment, the value for the access slot for the UE may be determined as:

Slot_k=number_preamble_tx*(msg1_detection_prob)*Slot_K_system

Because during collision, the UE may fail after a maximum number of preamble attempts are tried (e.g., MAX_preamble_tx), assumed to be ten (10) by 3GPP, after a number of attempts (e.g., a few attempts), the UE should make sure this limit should not be exceeded. So, the UE should wait for a longer time when the surge of MTC device access may end or decay.

Note that Slot_K_system is the slot length parameter indicated by the system.

Also note that the msg1_detection_prob is given by $$1 - \frac{1}{e^i}$$

where i indicates the i-th preamble transmission.

The eNB may update the access information discussed above periodically and broadcast this information to the UE in the cell.

Embodiments of the techniques described herein have a number of advantages over conventional approaches. For example, constraining each MTC device to transmit access requests a particular slot of an access cycle using a particular preamble can reduce or minimize the chance of access collisions with other MTC devices and/or other H2H devices.

Reducing collisions allows the radio resources to be used more efficiently, e.g., by reducing the signaling overhead required to schedule access requests and by reducing the number of retransmissions that results from collisions and subsequent back-off transmissions. For another example, the reporting time of a MTC device is more predictable (relative to random access) at the network because the network already knows the information that is used to select the access slot and the preamble to be utilized in the access slot, e.g., the SFN and the IMSI of the MTC device. Forward link overhead and/or congestion in the access slot selection approach is smaller than in the polling approach for the same level of collision performance. Moreover, the impact to the existing mechanism is small.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

The invention claimed is:

1. A method comprising:
receiving, at a wireless communication device from a network node, an assigned one of a plurality of time intervals in a periodically repeating access cycle for transmission of an access signal, the plurality of time intervals in the access cycle based on synchronization information broadcast over an air interface to the wireless communication device so that the wireless communication device is synchronized with other wireless communication devices on the same access cycle with the same numbering of the time intervals;
receiving, at the wireless communication device from the network node, a preamble assignment for the assigned one of the plurality of time intervals;
transmitting, at the wireless communication device, the access signal over an access channel in the assigned one of the plurality of time intervals using a preamble corresponding to the preamble assignment;
wherein the plurality of time intervals are a plurality of time slots in the periodically repeating access cycle, and wherein receiving an assigned one of the plurality of time intervals comprises receiving one of the plurality of time slots based on a slot numbering comprising system frame number associated with the selected one of the slots and broadcast over the air interface.

2. The method of claim 1 wherein receiving an assigned one of the plurality of time slots comprises receiving a time slot associated with a system frame number when the system frame number is equal to an identification number of the wireless communication device modulo a period of the access cycle.

3. The method of claim 1 wherein receiving an assigned one of the plurality of time slots comprises receiving a time slot associated with a system frame number when the system frame number is equal to a selected portion or permutation of an identification number of the wireless communication device.

4. The method of claim 1 wherein receiving an assigned one of the plurality of time slots comprises receiving a time slot associated with a system frame number when the system frame number is equal to a hash of an identification number of the wireless communication device.

5. A method, comprising:
constraining a wireless communication device to transmit access signals over an access channel corresponding to a preamble assignment received from a network node, during an assigned time slot received from the network node, the assigned time slot comprising one of a plurality of time slots that make up a periodically repeating access cycle;
wherein the assigned time slot is associated with a system frame number when the system frame number is equal to an identification number of the wireless communication device modulo a period of the periodically repeating access cycle.

6. A method, comprising:
constraining a wireless communication device to transmit access signals over an access channel corresponding to a preamble assignment received from a network node, during an assigned time slot received from the network node, the assigned time slot comprising one of a plurality of time slots that make up a periodically repeating access cycle;
wherein the assigned time slot is associated with a system frame number when the system frame number is equal to a selected portion of an identification number of the wireless communication device, when the system frame number is equal to a hash of the identification number, or when the system frame number is pre-assigned by the base station.

* * * * *